(12) United States Patent
Hsu

(10) Patent No.: US 7,066,337 B2
(45) Date of Patent: Jun. 27, 2006

(54) REUSABLE FILTER PORT ASSEMBLY FOR INSTALLATION ON THE WALL OF A BAG

(76) Inventor: Wei K. (Lou) Hsu, 113 Highway 24, P.O. Box 272, Commerce, TX (US) 75429

( * ) Notice: Subject to any disclaimer, the term of this patent is extended or adjusted under 35 U.S.C. 154(b) by 323 days.

(21) Appl. No.: 10/164,773

(22) Filed: Jun. 5, 2002

(65) Prior Publication Data

US 2003/0126843 A1    Jul. 10, 2003

Related U.S. Application Data

(60) Provisional application No. 60/346,321, filed on Jan. 5, 2002.

(51) Int. Cl.
*A01G 1/04* (2006.01)
(52) U.S. Cl. ............... 210/452; 47/1.1; 215/261; 383/102; 383/80; 55/385.4
(58) Field of Classification Search ............. 206/439; 47/1.1; 215/261, 259; 383/102, 80; 210/452; 55/385.4; 222/189.07, 189.09
See application file for complete search history.

(56) References Cited

U.S. PATENT DOCUMENTS 2,687,158 A * 8/1954 Owen ..................... 206/521
4,027,427 A * 6/1977 Stoller et al. ................ 47/1.1
5,230,430 A * 7/1993 Kidder .................... 206/484.1
5,891,223 A * 4/1999 Shaw et al. ................. 96/134
6,524,361 B1 * 2/2003 Thornton et al. ........... 55/385.4

* cited by examiner

*Primary Examiner*—Terry K. Cecil
(74) *Attorney, Agent, or Firm*—Sherman D. Pernia

(57) ABSTRACT

A reusable filter port assembly is installable on the wall of a sterilizable cultivation bag, such as is used in the cultivation of mushrooms. A grommet and locking collar are removably installed in the wall of the cultivation bag or pouch to provide gas flow communication between the interior of the bag and the ambient environment after the bag is sealed. A removable filter cap holds a filter member over the opening of the filter port assembly to prevent undesired particles from passing through the port of the assembly. In use, the grommet is placed against the interior surface of a bag or pouch, such as a plastic cultivation bag. The collar is screwed down over the grommet from the exterior surface of the bag to form a grommet-collar combination fixed in place to the wall of the bag. Once installed, a patch of bag material of the bag wall is still covering the grommet opening of the neck tube. The patch of bag material is then cut out or otherwise removed from the port opening to provide communication between the interior of the bag and the ambient environment. The filter cap is attached to the grommet-collar combination to generally allow the passage of gasses and prevent passage of particulates.

5 Claims, 3 Drawing Sheets

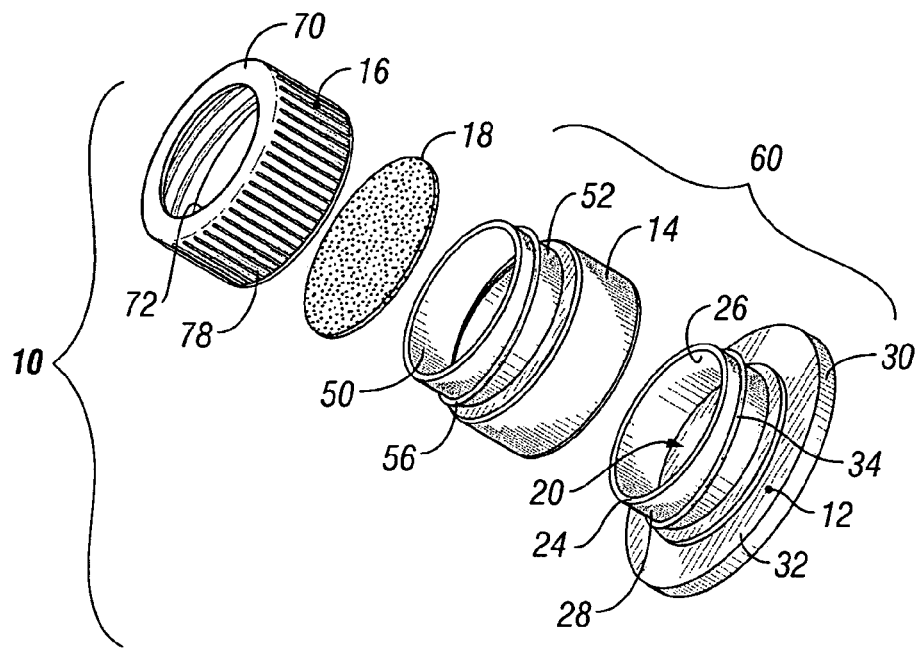
FIG. 1
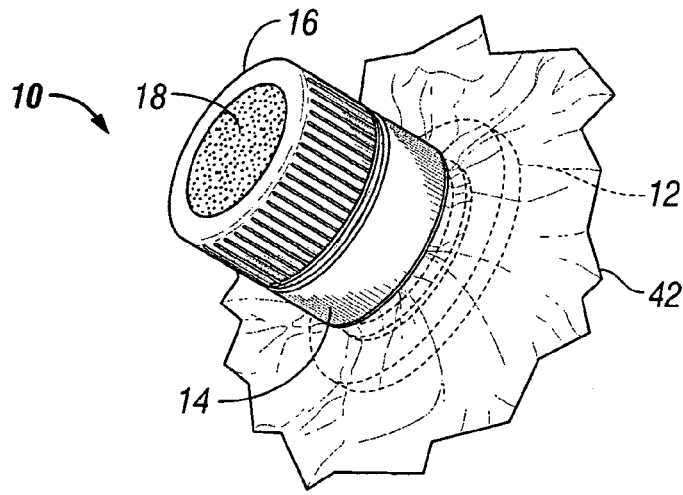
FIG. 2
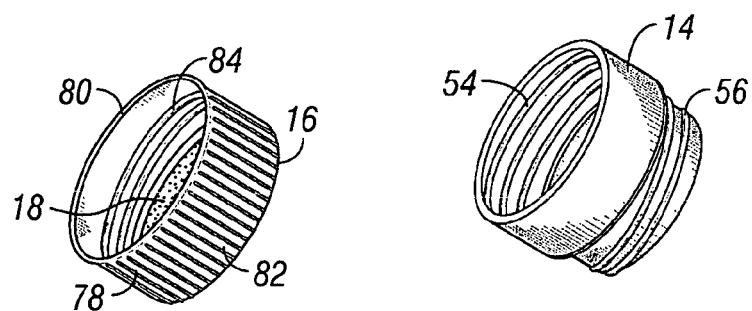
FIG. 3      FIG. 4

REUSABLE FILTER PORT ASSEMBLY FOR INSTALLATION ON THE WALL OF A BAG

The present application claims the benefit of prior filed U.S. Provisional Application, Ser. No. 60/346,321, filed Jan. 5, 2002, to which the present application is a regular U.S. National Application.

FIELD OF THE INVENTION

The present invention is in the field of sterilizable cultivation containers for growing selected organisms in isolation from the ambient environment. More specifically, it relates to a reusable micro-filtration membrane assembly for installation in the wall of a sterilizable cultivation container, and in particular, to such bag-type containers for the cultivation of edible fungi.

BACKGROUND OF THE INVENTION

During growth, aerobic organisms require oxygen and produce carbon dioxide in order to grow and maintain a pure strain of a selected organism in a cultivation system, it is advantageous to exclude competing organisms. This can include the exclusion of microorganisms from the growth environment of the cultivation system, at least until the desired organism is inoculated into the system and has sufficiently established itself. Additionally, it is important to maintain the proper oxygen to carbon dioxide ratio. Sterilizable cultivation containers are used extensively for the cultivation of edible mushrooms to provide proper growth condition, free from contaminating organisms, and to allow the exchange of oxygen and carbon dioxide with the ambient environment.

Much of this cultivation is accomplished using plastic pouches or bags. Further, the cost of bags and pouches can represent a high percentage of the total cost of raw materials for the cultivation process. This encourages the recycling of the bags and pouches. Historically, in order to provide proper venting when using recycled cultivation containers, growers often resort to cotton vent plugs. Such make-shift measures can be inherently less reliable or controllable than desired, and may not prevent the intrusion of unwanted microorganisms into a cultivation container.

Control of the internal growth environment inside a cultivation container is important, and the field has been motivated to address this issue. For example, U.S. Pat. No. 5,230,430, noting that it is desirable to maintain moisture content, attempts to provide a method for moisture control. However, the '430 patent does not teach a means for modifying the moisture conditions once the container is in use in the field to increase moisture loss. Also, the manufacture of the container of the '430 patent is complicated in that it requires the integration of a filter element into an otherwise ordinary plastic bag during the course of manufacture of the bag. Also, because of the integrated filter element of the '430 bag and similar cultivation containers, the ability to recycle containers is reduced.

Also useful for facilitating the recycling of cultivation bags are filter devices which themselves are removable and separately replaceable or recyclable. An example of a recyclable filter device is the filter cover of Stoller et al., U.S. Pat. No. 4,027,427. Stoller discloses a temporary filter cover which is installed on the neck of a plastic cultivation bag during a growth process, and is removed for reuse when the growth process is complete. Although it may be generally useful for its intended purpose, the Stoller filter cover potentially can separate from the cultivation bag when its cap is removed from its collar.

Therefore, it would be useful in the field to have an alternative reusable filter assembly having a cap that may be removed without risk of the rest of the device separating from the bag on which it is installed.

SUMMARY OF THE INVENTION

The present invention is a reusable filter port assembly for installation on the wall of a bag or pouch, such as is used in the cultivation of mushrooms. The present filter port assembly is intended to be installed in the wall of the cultivation bag, rather than in the opening in the neck of the bag. Because the neck opening in a bag can be very large relative to the cross-sectional opening in a filter port assembly, installing the present device in the wall of a bag does not require the device to deal with the mass of excess material of a typical bag neck passing through the device as with some other devices (see Stoller et al. above).

The present reusable filter port assembly comprises a grommet, a locking collar and a filter cap. In use, the grommet is placed against the interior surface of a bag or pouch, such as a plastic cultivation bag. The collar is screwed down over the grommet from the exterior surface of the bag. This forms a grommet-collar combination which is fixed in place to the wall of the bag or pouch. Once installed, a patch of bag material of the bag wall is still covering the grommet opening of the neck tube. (Optionally, the bag may be filled, sealed, sterilized or otherwise treated with the patch in place.) The patch of bag material is then cut out or otherwise removed from the grommet opening to provide communication between the interior of the bag and the ambient environment. The filter cap is attached to the grommet-collar combination to restrict the communication to the passage of gasses.

The grommet has a base plate from the center of which extends a grommet neck tube. The opening passing through the grommet (grommet opening) is defined by the lumen of the neck tube extending from the base plate. The neck tube provides a passage through the wall of the bag while the base plate provides a surface to engaging or contacting the inner surface of the wall of the bag. The neck tube has an interior neck surface lining the grommet opening and an exterior neck surface which is threaded.

The locking collar has an inner collar surface and an outer collar surface. The inner collar surface is threaded and disposed to engage the complementary threaded exterior neck surface of the grommet. Screwing the locking collar down over the neck tube draws the locking collar into close contact with the base plate form a grommet-collar combination. Placing the grommet against the inner surface of a cultivation bag and then screwing the collar down sealably engages the wall of the bag between the grommet and the collar. Once the grommet-collar assemble is in place, the portion of the bag wall covering the grommet opening can be cut away to clear the lumen of the neck tube.

Alternatively, an opening can be precut in the bag wall through which the neck tube of the grommet is closely passed and the locking collar can be screwed down to sealably engages the wall of the bag between the grommet and the collar. The grommet-collar combination has a first end, which is distal from the base plate of the combination, and a second end at the baseplate of the combination which is disposed inside the bag when the combination is in installed on a bag.

The filter cap is attachable to the grommet-collar combination. The filter cap has a top, a portion of which top has an aperture through it. Further, the filter cap has a means for attaching the filter cap to the grommet-collar combination proximate the first end of the grommet-collar combination. Attaching the filter cap to the grommet-collar combination covers access to the grommet opening. This may be accomplished by the filter cap being a screw cap wherein the top of the screw cap has a surrounding rim. The rim has an inner surface and an outer surface, at least one of which is threaded to engage a cap mating thread disposed at the first end of the grommet-collar combination.

The filter cap mating thread at the first end of the of the grommet-collar combination may be disposed on the outer collar surface of the locking collar, and its compliment on the inner surface of the surrounding rim of the screw cap is threaded. In this situation, the filter cap is attachable to the collar. Alternatively, the cap thread at the first end of the grommet-collar combination may be disposed on the exterior neck surface of the neck tube, with its compliment on the inner surface of the surrounding rim of the screw cap. In a further alternative, the cap mating thread at the first end of the of the grommet-collar combination may be disposed on the inner collar surface of the locking collar, with the complimentary thread on the outer surface of the surrounding rim of the screw cap. Similarly, in another alternative, the cap mating thread at the first end of the grommet-collar combination may be disposed on the interior neck surface of the neck tube, with the complimentary thread on the outer surface of the surrounding rim of the screw cap.

The filter serves as a receptacle for receiving and mounting a filter membrane. The filter membrane covers the aperture in the top of the filter cap. The perimeter of the aperture in the top of the cap can provide a mounting surface for receiving and mounting the filter membrane. The filter membrane can be fixed to the mounting surface of the cap, or can be separate and held in place by screwing the filter cap down against the first end of the grommet-collar combination. Alternatively, the filter membrane can be draped over the first end of the grommet-collar combination and held in place by screwing the filter cap down over it.

BRIEF DESCRIPTION OF THE DRAWINGS

FIG. 1 is an exploded, perspective view of the present reusable filter port assembly.

FIG. 2 is an illustration of the reusable filter port assembly installed on a wall section of a plastic bag.

FIG. 3 is a perspective view of the inside of the screw cap of the filter port assembly.

FIG. 4 is a perspective view of the inside of the collar of the filter port assembly.

DETAILED DESCRIPTION OF THE INVENTION

Figure 5:
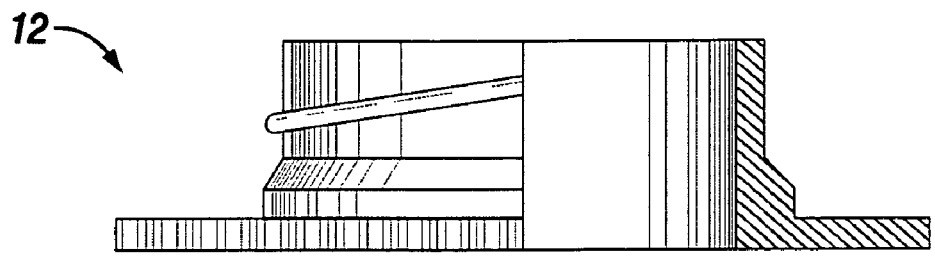
FIG. 5 is a partial cross-section of a side elevation of the grommet of the filter port assembly.
Figure 6:
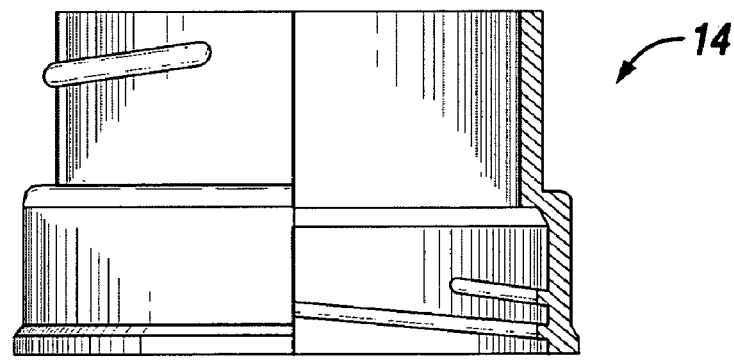
FIG. 6 is a partial cross-section of a side elevation of the collar of the filter port assembly.

Referring now to the drawings, the details of preferred embodiments of the present invention are graphically and schematically illustrated. Like elements in the drawings are represented by like numbers, and any similar elements are represented by like numbers with a different lower case letter suffix.

As shown in FIG. 1, the present reusable filter port assembly 10 comprises a threaded grommet 12, a locking collar 14, a filter cap 16 and a filter member 18. The threaded grommet 12 has a grommet opening 20 passing through the central portion of the grommet 12. The grommet opening 20 is defined at a first end by a neck tube 24 and at a second end by a baseplate 30 from which the neck tube 24 extends. The neck tube 24 is disposed for interfacing with the wall 42 of a cultivation bag or pouch (not shown) to provide a passage through the wall 42 via the grommet opening 20. The baseplate 30 has an upper surface 32 for contacting the bag wall 42 at an inside surface of the bag. The neck tube 24 has an interior neck surface 26 lining the grommet opening and an exterior neck surface 28 which is threaded with a collar engaging thread 34.

The locking collar 14 having an inner collar surface 50 and an outer collar surface 52. In the preferred embodiment shown in the figures, the inner collar surface 52 has a neck engaging thread 54 (see FIG. 4) for engaging the collar thread 34 on exterior neck surface 28 of the grommet 12. Engaging the complimentary collar thread 34 and neck thread 54 allows rotation of the collar 14 and grommet 12 relative to each other to reversibly draw the locking collar 14 into contact with the base plate 30 proximate the neck tube 24 to form a grommet-collar combination 60. The grommet-collar combination 60 has a first end 62 distal from the baseplate 30 of the combination 60 and a second end 64 at the baseplate 30 of the combination 60 (see FIG. 9).

Figure 7:
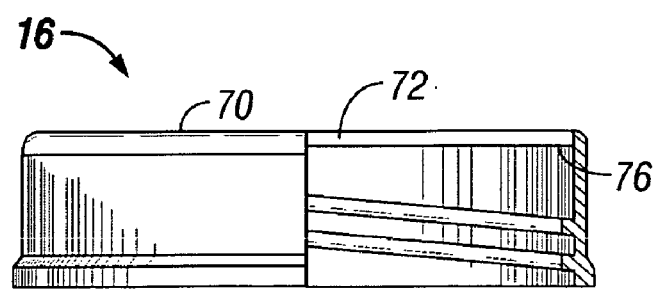
FIG. 7 is a partial cross-section of a side elevation of the filter cap of the filter port assembly.

A removable filter cap 16 is attachable to the first end 62 of the grommet-collar combination 60. The filter cap 16 has a top 70 with an aperture 72 through a portion of the top and an attaching means 74 for attaching the filter cap 16 to the grommet-collar combination 60 to cover the grommet opening 20 proximate the first end 62 of the grommet-collar combination 60. The filter cap 16 includes a filter receptacle 76 (see FIG. 7) for receiving and mounting a filter 18 to the filter cap 16. In a preferred embodiment shown in the figures, the filter receptacle 76 for mounting the filter 18 to cover the aperture 72 is the inside perimeter of the top 70 of the filter cap 16 proximate the aperture 72. Appropriate materials for accomplishing filter members 18 for use in the present invention are commercially available and known to and readily practicable in the present filter port assembly 10 by one of ordinary skill in the art.

In a preferred embodiment of the reusable filter port assembly 10, the filter cap 16 was a screw cap, wherein the cap top 70 had a surrounding rim 78. The cap rim 78 further had an inner surface 80 and an outer surface 82. At least one of the two cap rim surfaces 80 & 82 was threaded with a collar-grommet engaging thread 84 to engage a complementary thread disposed at the first end 62 of the grommet-collar combination 60. In this preferred embodiment, the collar-grommet engaging thread 84 was disposed on the inner surface 80 of the cap rim 78.

In this preferred embodiment of the reusable filter port assembly 10, the collar-grommet combination 60 had a cap mating thread 56 at the first end 62 of the of the grommet-collar combination 60. The cap mating thread 56 was disposed on the outer collar surface 52 of the locking collar 14 and engaged the complementary collar-grommet thread 84 on the filter cap 16. This allowed the filter cap 16 to be removably screwed drown in place on the first end 62 of the collar-grommet assembly 60 to effectively cover the grommet opening 20 with the filter member 18.

Figure 8:
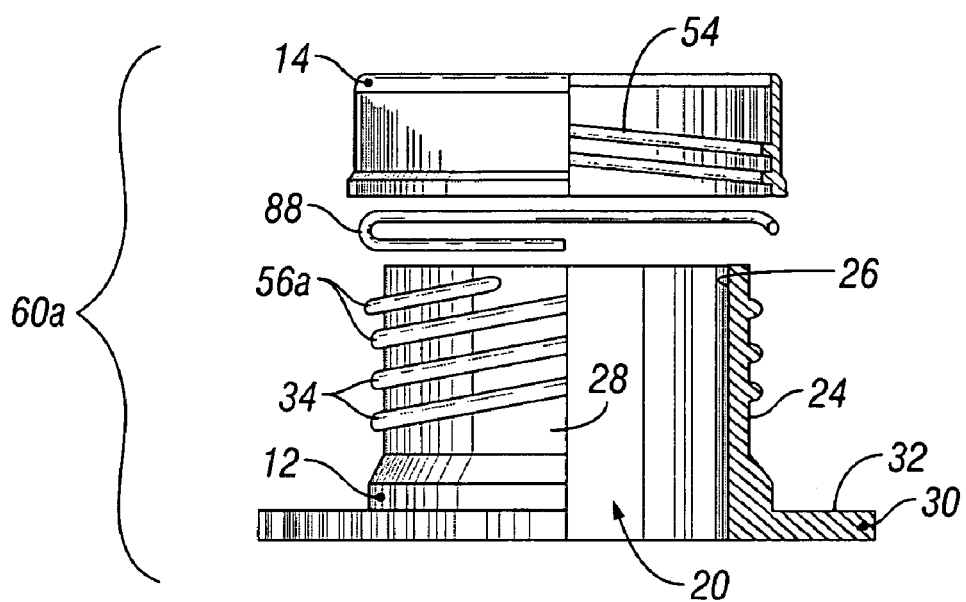
FIG. 8 is an exploded, partial cross-sectional view of a collar-grommet combination where the filter cap screws onto the neck of the grommet after the collar-grommet combination is assembled.
Figure 9:
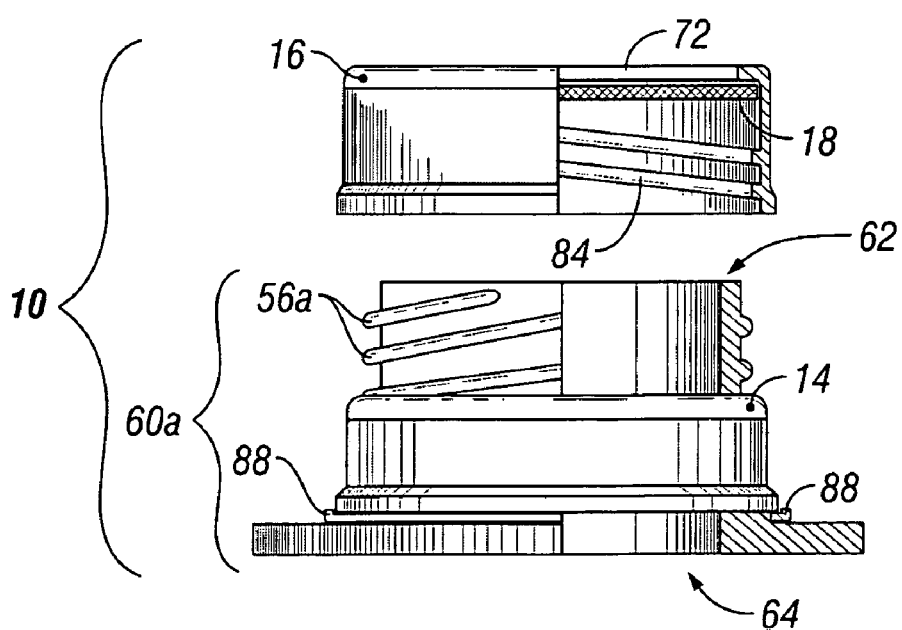
FIG. 9 is a partial cross-sectional view of the grommet-collar combination of FIG. 8 in an assembled configuration, and illustrating the grommet neck disposed for receiving the filter cap.

In an alternative preferred embodiment of the reusable filter port assembly 10 shown in FIGS. 8 and 9, the cap mating thread 56a at the first end 62 of the grommet-collar combination 60a is disposed on the exterior neck surface 28 of the neck tube 24. In this embodiment, the inner surface 80 of the surrounding rim 78 of the screw filter cap 16 is threaded as above. However, the filter cap 16 engages the neck tube 24 rather than the locking collar 14.

Optionally, as shown in FIG. 8, a washer 88 may be placed may be included with the device 10, and placed on either of both sides of the bag wall 42. The material and configuration of the washer 88 is selectable by one of ordinary skill in the art in consideration of the specific application (i.e., the bag wall material) or situation (e.g., an over-sized hole requiring gathering together of the bag wall material). The washer 88 may be of a relative hard material to impart increased compression of the bag wall 42, or of a relatively soft material where it is desirable for the washer 88 to conform to the bag wall 42 with which it is interfacing.

Other alternatives for mating the filter cap 16 to the grommet-collar combination 60 are practicable in the present filter port assembly 10 by the ordinary skilled artisan. For example, the cap mating thread 56 at the first end 62 of the of the grommet-collar combination 60 for engaging the screw filter cap 16 can be disposed on the inner collar surface 50 of the locking collar 14, with the outer surface 82 of the surrounding rim 78 of the filter cap 16 being threaded (not shown). In another example, the cap mating thread 56 at the first end 62 of the grommet-collar combination 60 for engaging the filter cap 16 can be disposed on the interior neck surface 26 of the neck tube 24, with the outer surface 82 of the surrounding rim 78 of the screw cap 16 being threaded (not shown). In still another example, the filter cap 16 can be a simple, removable plug (not shown), like a rubber stopper, that is friction fitted into the first end 62 of the collar-grommet combination 60.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A reusable filter port assembly installed on the wall of a bag, the assembly comprising:
    a grommet having a base plate and a grommet opening defined by a neck extending from the base plate, the neck passing through the wall of the bag with the base plate contacting the wall of the bag at an inside surface of the bag, the neck having an interior neck surface lining the grommet opening and an exterior neck surface which is threaded;
    a locking collar contacting an outer surface of the bag, the locking collar having an inner collar surface and an outer collar surface, the inner collar surface being threaded for engaging the threaded exterior neck surface of the grommet and drawing the locking collar into close contact with the base plate proximate the neck to form a grommet-collar combination having a first end distal from the base plate of the combination and a second end at the base plate of the combination;
    a filter cap removably attached to the collar outer surface of the grommet-collar combination, the filter cap having a top and an aperture through a portion of the top and a means for attaching the filter cap to the grommet-collar combination to cover the grommet opening proximate the first end of the grommet-collar combination; and
    a filter receptacle on the filter cap proximate a perimeter of the aperture for mounting a filter to cover the aperture.

2. The reusable filter port assembly of claim 1, further comprising the filter cap being a screw cap wherein the top has a surrounding rim, the rim having an inner surface and an outer surface, at least one of which is threaded to engage a cap mating thread disposed at the first end of the grommet-collar combination.

3. The reusable filter port assembly of claim 2, wherein the cap mating thread at the first end of the grommet-collar combination for engaging the screw cap is disposed on the outer collar surface of the locking collar, and the inner surface of the surrounding rim of the screw cap is threaded.

4. The reusable filter port assembly of claim 2, wherein the cap mating thread at the first end of the grommet-collar combination for engaging the screw cap is disposed on the exterior neck surface, and the inner surface of the surrounding rim of the screw cap is threaded.

5. The reusable filter port assembly of claim 1, further comprising at least one washer disposed between the grommet base plate and the locking collar.

* * * * *